Figure 3:
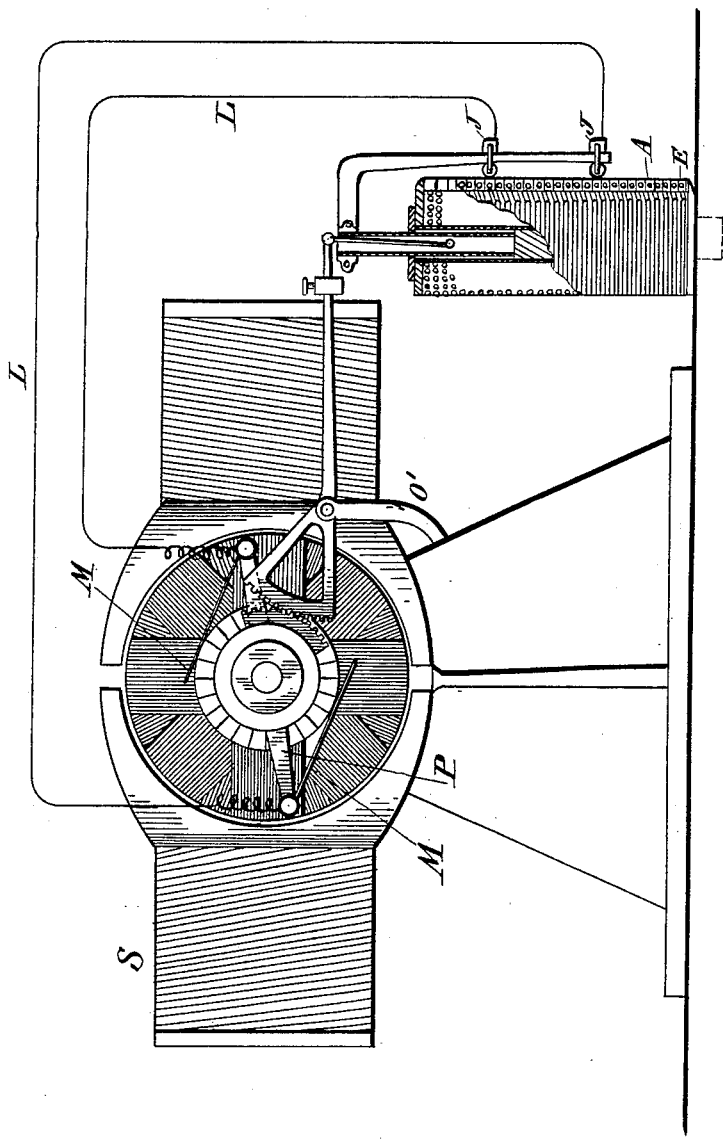

(No Model.) 2 Sheets—Sheet 1.
W. H. MILLER.
ELECTRICAL GOVERNOR.
No. 520,267. Patented May 22, 1894.
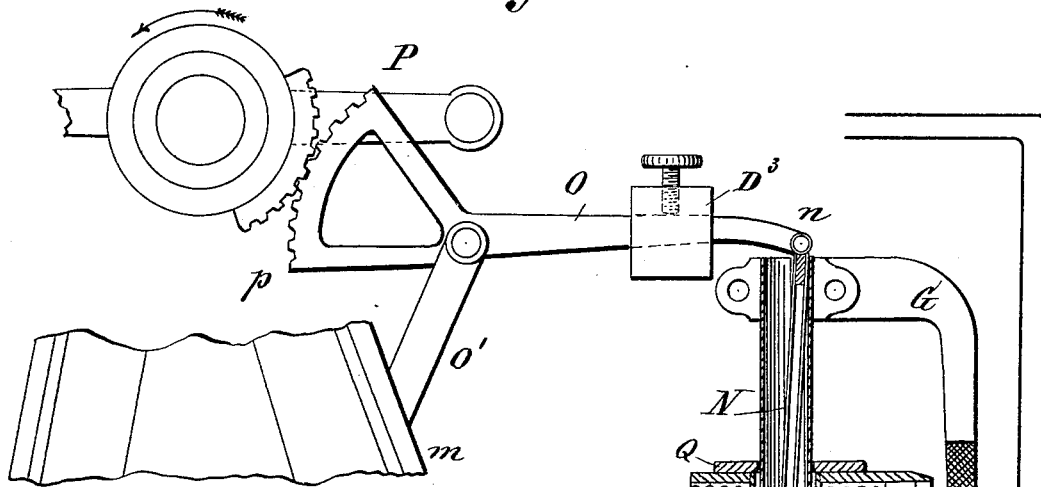
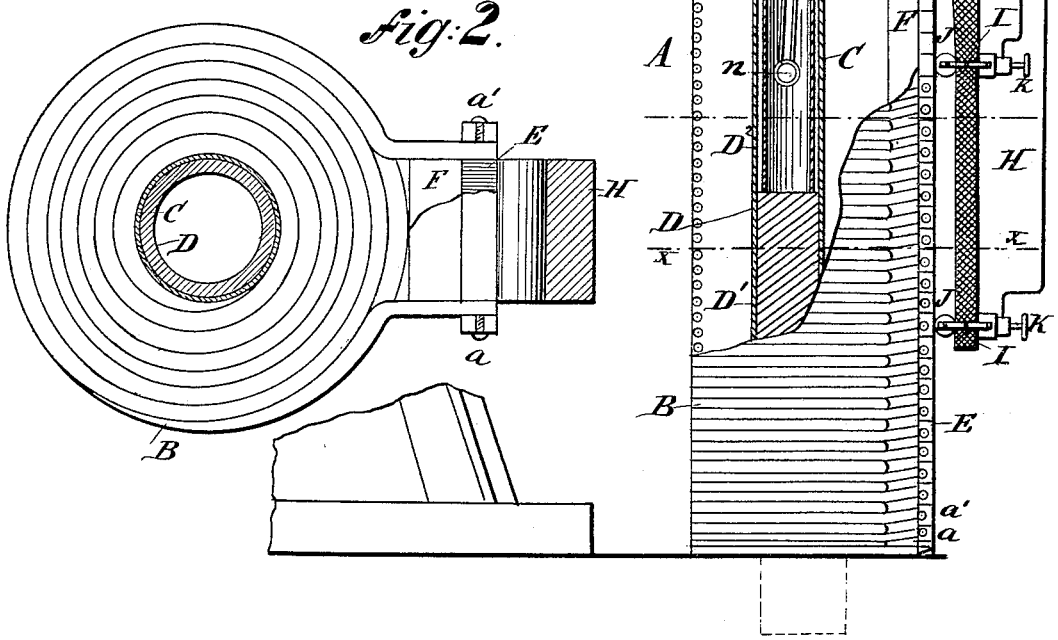
WITNESSES:
F. Budd.
N. Sohn.
INVENTOR
William H. Miller
BY
Geo. H. Benjamin
ATTORNEY (No Model.) 2 Sheets—Sheet 2.

W. H. MILLER.
ELECTRICAL GOVERNOR.

No. 520,267. Patented May 22, 1894.

WITNESSES:
Ira R. Steward.
F. K. Budd

INVENTOR
William H. Miller
BY
Geo. H. Benjamin
ATTORNEY

UNITED STATES PATENT OFFICE.

WILLIAM H. MILLER, OF NEW YORK, N. Y., ASSIGNOR TO GEORGE H. BENJAMIN, OF SAME PLACE.

ELECTRICAL GOVERNOR.

SPECIFICATION forming part of Letters Patent No. 520,267, dated May 22, 1894.

Application filed June 18, 1884. Serial No. 135,358. (No model.)

*To all whom it may concern:*

Be it known that I, WILLIAM H. MILLER, a citizen of the United States, and a resident of the city, county, and State of New York, have invented certain new and useful Improvements in Regulators for Dynamo-Electric Machines and Similar Apparatus, of which the following is a specification.

My invention relates to electric regulators or governors of the class which may be employed to govern the strength or intensity of the current derived from a dynamo electric machine, the speed of a steam engine, and generally, the movement of any device in connection with which such a regulator may be found useful and practicable. As applied to a dynamo electric machine, the object of the regulator is to so act upon the current collecting brushes that they may be automatically shifted to those positions where the current taken up by them will be constant under varying conditions of speed of the dynamo, or resistance of the circuit within which the machine is included. As applied to a steam engine, the regulator serves to control the position of the throttle valve, or cut off, in order to maintain a constant speed of the engine under varying conditions of load and steam pressure.

In all the various forms of electric regulators or governors heretofore constructed, and of which I am aware, the mechanism acting upon the collecting brushes of the dynamo, valve or other device, has been given motion by means of a solenoidal magnet inclosing a loosely fitting armature, which is drawn within the magnet with a force proportional to the strength of the current traversing the helix of the magnet.

It will be understood by those skilled in the art, to which this invention pertains, that the energy exerted by any ordinary magnet increases as the armature approaches its pole, and with an axial or solenoidal magnet, the energy decreases as the armature enters into the core or body of the magnet, thus, in either case, producing a new balance with each new adjustment or variation of the current transmitted through the helix of the magnet. By making the magnet long, and the length of the motion or stroke of the armature short, this arrangement can be made to approach uniformity. Theoretically, the solenoidal magnet must be infinitely long or the length of the stroke infinitely short, or zero, to be perfect.

My improved electric regulator differs from all others heretofore made, in that the energy exerted by the electro-responsive device will be always the same for the same current strength, or in other words, the balance which is normally produced, is always maintained irrespective of the position which the movable armature of the magnet may occupy as regards the magnet as a whole, and this, for the reason that the construction of the magnet is such that its acting portion advances as the armature advances when influenced. Thus, the pull exerted on the armature, as heretofore stated, will be always the same for the current strength upon which the adjustment is made.

My improved regulator likewise differs from other regulators in that the regulating portion of the electro-responsive device or magnet is actuated by the magnet itself, and the energy of the magnet is preserved constant for a given current strength, by reason of the regulation and effect of the movement of the armature within the magnet, as hereinafter more fully described.

In the accompanying drawings, which illustrate my invention, similar letters of reference indicate like parts.

Figure 1, is an elevation of my improved electric regulator, showing the upper portion of the magnet in section. Fig. 2, is a transverse section through the magnet on the line X, X, Fig. 1, showing one of the coils of which the magnet is formed, and the method of attaching the ends of the coils to adjacent sections of the regulator commutator. Fig. 3, shows the regulator connected both mechanically and electrically to a dynamo electric machine.

In the drawings, A is a solenoidal magnet, composed of a number of separate sections or coils B, of insulating wire, coiled horizontally, and superposed one upon the other around the metallic core C.

D, is the armature, composed of two parts, D' formed of soft iron, and $D^2$, a tubular portion, preferably of brass, or other non-magnetic metal. The armature D, is located within the core C, and is arranged to move freely when influenced by the current traversing the helix of the magnet and by the action of gravity acting upon the mass of the armature. If required, the armature may be provided with suitable weights in order to increase its gravital action, and to overcome the friction of the moving parts to which it may be connected. Such a weight is shown at $D^3$. A single section B, of the magnet, is shown in view, Fig. 2, and consists of a coil of wire coiled horizontally and one end connected to one segment of the regulator commutator E, by the set screw $a$, and the other end, by the set screw $a'$, to the segment of the commutator next above that to which the other end is connected. Each coil forms two of the convolutions of the thirty or forty, or more, which make up the body of the magnet. The commutator E, is composed of metallic strips corresponding in number with the sections of the magnet. The strips are arranged one above the other and insulated from each other in any suitable manner. The commutator is arranged along one side of the magnet A, and is supported in its proper position by means of the strip F, of wood, rubber or other insulating material.

Connected to the non-magnetic tubular portion of the armature D, is an arm G, the end of which H, is preferably made of non-magnetic or insulating material, and bent downward, so as to lie parallel to the commutator E of the magnet. Upon the insulated portion H, of the arm G, are arranged the adjustable rings or other forms of fastening devices I, to which are connected contact brushes or rollers J, J', which bear upon the commutator E and thus convey the current from the prime source of electric energy to the coils on the magnet included between the brushes J and J'. Instead of making the lower part of the arm G of insulating material, the brushes J and J' may be insulated from the arm G.

K, K are binding posts on the rings I, to which the leads L, communicating with the brushes M of the dynamo electric machine, may be connected.

Q, is a plate on the top of the magnet, provided with an orifice of lesser diameter than the core of the magnet, and which serves to prevent the armature from being lifted out of the magnet.

Pivoted at $n$, within the armature $D^2$, is the link N, also pivoted at $n'$ to the rock shaft O, which is pivoted at O' to the frame $m$ of the dynamo. The end of the rock shaft gears at $p$, with the brush shifting device of the dynamo. P, may, however, be the valve or cut off of a steam engine or other device to which it is desired to communicate the motion occurring within the regulator.

The operation of my improved device will be readily understood. The armature D, by reason of its weight, or added weights, normally seeks the lowest position in the magnet A, indicated by the dotted lines in Fig. 1. When it is desired that the regulator be employed to control the current from a dynamo electric machine, the brushes M of the dynamo are connected through the leads L, to the brushes J and J' of the regulator, and the rock shaft O is brought into mechanical relation with the brush shifting devices P, of the dynamo. The brushes J and J' are then so arranged as to include a certain number of sections of the magnet A, between them, the number depending upon the balance which it is desired to obtain. The brushes are then fixed in this position. With any increase in the currrent from the dynamo, the armature D will be lifted within the magnet and the motion of the armature will be communicated through the rock shaft to the brush holder P and the brushes shifted to such a position that the current generated will be restored to its normal amount. It will be observed that as the armature is lifted, the brushes J and J' on the arm G, follow the motion of the armature, so that the number of coils or sections of the magnet included between the brushes remains the same, irrespective of the position of the brushes relative to the magnet as a whole. We will suppose that a current increases its quantity by one ampère and that the movement is such that two segments of the commutator are picked up in advance, and two dropped out in the rear, and that the brushes are moved a given distance. Now, if a similar change takes place, due to any well known cause, similar advances will be made by the brushes, and this is true, except that the advances will be in a reverse direction, for any decrease in the generated current. The position of the armature will be maintained at the advanced point. In all other devices of this character, for each advance of the armature, there is a decrease in the energy exerted, and hence, the armature, as the current is brought down to the normal condition, tends to move back to its old position, the result being a constant moving or fluctuation of the armature within its magnet. This fact is so well known that it has been found necessary to have a compensating resistance in order to provide for this condition.

In case a varying amount of work is required, either one of the brushes may be made stationary. Hence, when the lower brush is fixed, the more the armature is lifted, the greater will be the length of the acting magnet, and the energy produced, and the reverse is true where the upper brush is fixed.

When my device is employed to regulate a steam engine or other apparatus not generating its own current, it will, of course, be necessary to attach a small generator of electricity, from which to supply the current necessary to energize the current of the regulator, and this small generator may be operated by the controlling engine or apparatus.

I wish it understood that I do not limit myself to any special mechanism interposed between the acting armature and the device to be regulated.

I claim as my invention—

1. In combination with a dynamo electric machine provided with brushes adjustable around the commutator of said machine, of a regulator therefor comprising a magnet, an armature, means for connecting said armature with said adjustable brushes, and mechanism for maintaining the pull of the armature constant, irrespective of its operative relation to said magnet, substantially as described.

2. As an attachment for dynamo machines, a current regulator comprising an electro-responsive device, including an armature energized by changes in the main or generated current, mechanism actuated by and which controls the action of said responsive device, to shift the magnetic field of the same, correspondent with the movement of the armature, and mechanism controlled by said responsive device and adapted to operate upon the brush-holding mechanism of the dynamo-electric machine, to shift the brushes of said machine to those positions where the current taken up by said brushes shall be constant.

3. A current regulator for a dynamo electric machine, comprising a sectional solenoidal magnet, a commutator for said magnet, an armature supporting an arm which overlies the commutator, adjustable brushes located upon said arm and mechanism connected to said armature and interposed between it and the brush holding mechanism of a dynamo electric machine, substantially as and for the purpose set forth.

WILLIAM H. MILLER.

Witnesses:
GEO. H. BENJAMIN,
A. E. SEXTON.